United States Patent
Kordak

Patent Number: 5,628,188
Date of Patent: May 13, 1997

[54] TORQUE CONTROL OF HYDROSTATIC MACHINES VIA THE PIVOT ANGLE OR THE ECCENTRICITY OF SAID MACHINES

[75] Inventor: Rolf Kordak, Lohr, Germany

[73] Assignee: Mannesmann Rexroth GmbH, Lohr, Germany

[21] Appl. No.: 212,804

[22] Filed: Mar. 15, 1994

[30] Foreign Application Priority Data

Mar. 15, 1993 [DE] Germany ............... 4308198.3

[51] Int. Cl.⁶ ............... F04B 1/08; G05D 17/00; G01D 1/16

[52] U.S. Cl. ............... 60/449; 60/452; 60/487

[58] Field of Search ............... 60/431, 449, 451, 60/452, 445, 487

[56] References Cited

U.S. PATENT DOCUMENTS

| | | | |
|---|---|---|---|
| 3,213,618 | 10/1965 | Cadiou | 60/451 X |
| 3,385,059 | 5/1968 | Leonard et al. | 60/451 X |
| 3,462,125 | 8/1969 | Gollwitzer et al. | 60/451 X |
| 3,488,956 | 1/1970 | Giles | 60/451 X |
| 3,969,896 | 7/1976 | Louis | 60/451 X |
| 4,284,389 | 8/1981 | Young et al. | 60/451 X |
| 4,688,380 | 8/1987 | Reinhardt et al. | 60/446 X |
| 4,736,585 | 4/1988 | Kordak | 60/452 |
| 4,747,268 | 5/1988 | Reinhardt | 60/484 X |
| 4,809,504 | 3/1989 | Izumi et al. | 60/449 X |
| 4,823,552 | 4/1989 | Ezell et al. | 60/451 X |
| 4,845,950 | 7/1989 | Metzner | 60/448 |
| 4,930,311 | 6/1990 | Dantlgraber | 60/448 X |
| 5,070,695 | 12/1991 | Metzner | 60/449 X |
| 5,077,973 | 1/1992 | Suzuki et al. | 60/431 X |
| 5,197,860 | 3/1993 | Nishida et al. | 417/34 |
| 5,251,440 | 10/1993 | Bong-dong et al. | 60/431 X |
| 5,267,441 | 12/1993 | Devier et al. | 60/452 |
| 5,303,551 | 4/1994 | Lee | 60/431 |
| 5,307,631 | 5/1994 | Tatsumi et al. | 60/452 |
| 5,341,311 | 8/1994 | Liebler | 60/452 X |

*Primary Examiner*—John E. Ryznic
*Attorney, Agent, or Firm*—Cushman, Darby & Cushman IP Group of Pillsbury Madison 7 Sutro LLP

[57] ABSTRACT

A circuit arrangement for controlling the output torque of a hydrostatic machine connected to a hydraulic system having an impressed operating pressure. The circuit arrangement has a control element for changing the output torque of the machine based upon operating parameters corresponding to pressure, speed, temperature and the like. Control means are supplied with a desired torque value for generating a control signal for actuating the control element. Pick-up means are connected to the control means and to the control element for picking up a pivotal angle $\alpha$ or an eccentricity $E$, respectively, representing an actual displacement volume of the hydrostatic machine. The pivotal angle $\alpha$ and the eccentricity $E$ are measured in either an analog or a digital manner. When measured in an analog manner, the desired value of the pivotal angle is $\alpha = M/P$ and the desired value of the eccentricity is $E = M/P$, where $M$ is the torque and $P$ is the pressure. When measured in a digital manner, the desired value for the pivotal angle and the eccentricity, respectively, are determined from previously determined measured values.

16 Claims, 6 Drawing Sheets

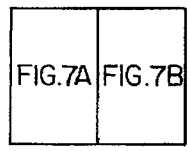
FIG. 7
FIG. 7A
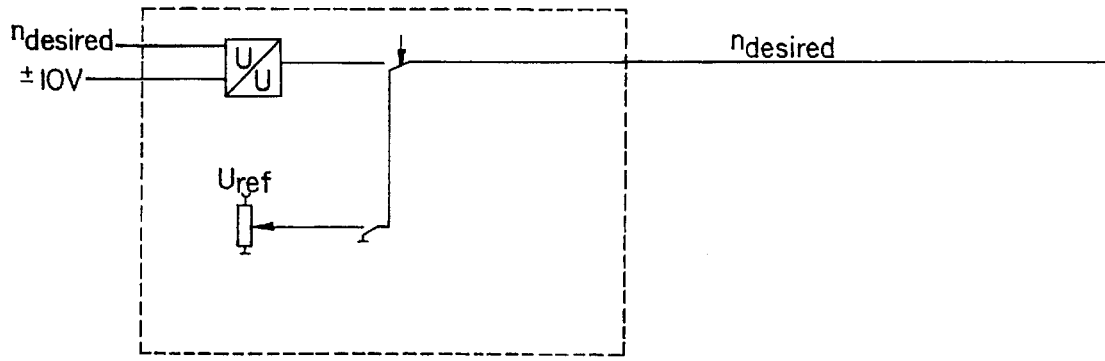
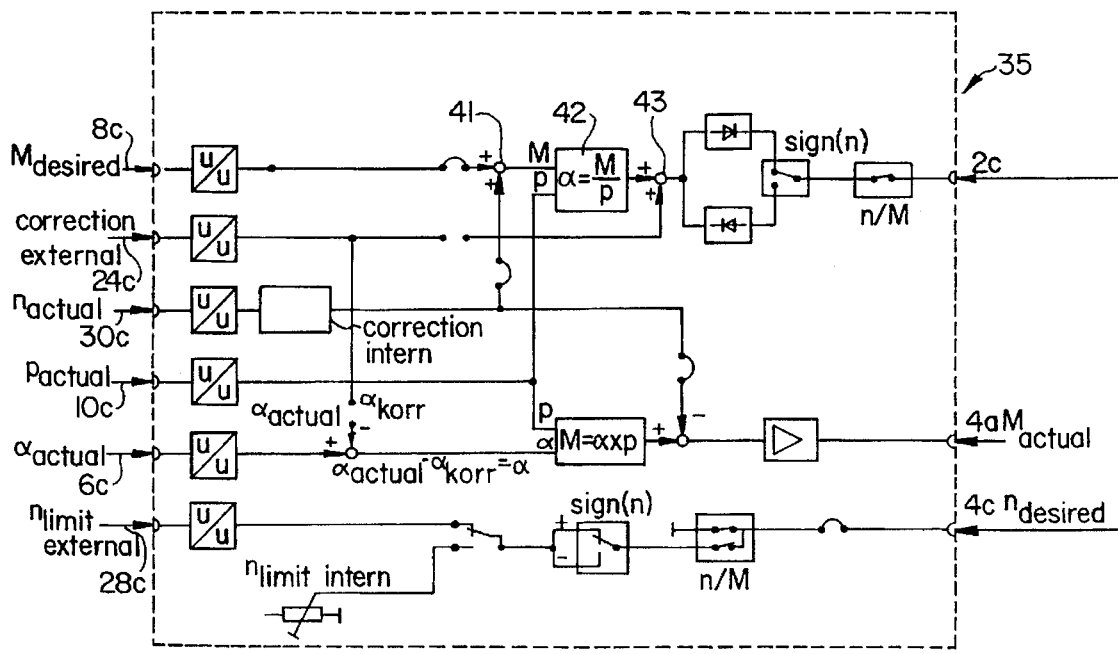

TORQUE CONTROL OF HYDROSTATIC MACHINES VIA THE PIVOT ANGLE OR THE ECCENTRICITY OF SAID MACHINES

TECHNICAL FIELD

The present invention relates to a circuit arrangement for controlling the torque of a unit of machines. The invention relates particularly to such an arrangement adapted to be used in a test equipment of a highly dynamic type for combustion engines.

BACKGROUND ART

It is already known to use the technical possibilities of the secondary control in the dynamic range in test equipment for engines. Please see in this context the case of a pure speed control as it is disclosed in "The Hydraulic Trainer", volume 6, pages 59 through 61, published by Mannesmann Rexroth GmbH, Lohr am Main, Germany.

As far as the problems are concerned with respect to said known test equipment it was not only considered to be necessary to measure and evaluate technical data, like the pressure, the volume flow, the temperature, the force, the speed, the acceleration and the gas composition, but it was further considered to be necessary to carry out dynamic tests for a long period of time, with the load being automatically changed and conditions being provided as they occur during road tests. For this kind of test operation the dynamic control of speed and torque and the measurement of said values is characteristic. The above-mentioned document discloses in detail a test cell together with a load machine, comprising a distribution gear means and two speed-controlled axial piston machines which are arranged in parallel. The test object is coupled thereto via a torque measuring hub. The use of a torque measuring hub, however, has the distadvantage, that it is relatively expensive. Further, the torque measurement hub cannot be subjected to dynamic loads and the hub needs to be replaced at an early stage, for instance, after about 500 hours of operation. In case a torque measurement hub brakes down during a test, the entire test has to be started again. Such a situation is clearly undesirable. Attention is drawn to the fact that the above-mentioned reference refers to the term "impressed operating pressure" at page 15 in the left column, a term which will be used below.

It is also considered to be prior art in the field of automobiles to use in test equipment for combustion engines direct current engines which are supplied via current controllers. In the course of such tests, the energy generated by the internal combustion engines is fed into the electric motor and is fed from there back into the mains. This requires a significant amount of control equipment. Also, because of the high mass inertia the dynamics of such test equipment does not fulfil many requirements. The suggestion to use converter-fed current machines having a speed-torque-characteristic similar to those of direct current machines, does not help even if one considers that the mass inertia moments can be reduced. Thus, even though the purely electric solution does not require a torque measurement hub, because the torque can be calculated from the current which is received or supplied, the above-mentioned distadvantages result.

DE-28 48 595 A1 discloses a method and apparatus for controlling the output torque of a gear means together with two hydrostats, a primary hydrostat and a second hydrostat, which are flow coupled by volume. The use of said apparatus requires an intrusion at the primary hydrostat for the purpose of changing the Δp for the control of the torque. This means, that the hydraulic spring formed by said apparatus has a disadvantageous result with respect to the dynamic of said apparatus.

DISCLOSURE OF THE INVENTION

It is an object of the present invention to avoid the disadvantages of the prior art.

It is a further object of the invention to provide a method and an apparatus for controlling the torque of a hydrostatic machine unit, that can be specifically used for highly dynamic test equipment for combustion engines.

The present invention starts from the recognition that for the purpose of avoiding a measuring hub and for the use of a hydrostatic solution and a system with impressed pressure the torque needs to be determined in a different way.

Inasmuch as the torque is proportional to the pressure difference and the displacement volume of a hydrostatic machine unit, it is suggested in accordance with the invention to turn to values like the pivot angle and the eccentricity, respectively, values which represent the displacement volume, so as to determine the torque. In this context, the speed can be easily determined for instance by means of a tacho generator. This means that the values which are required for the present invention are already present when using the principle of the secondary control, so that in accordance with the invention in particular an electronic control circuit (control signal generating means) need to be provided which generate a control signal, so as to change the displacement volume of the machine unit which determines the torque of the hydrostatic machine unit while considering the above-mentioned operating parameters. Said control signal is either calculated by means of the circuit for an analogue solution, or for a digital solution it is taken from a memory, for instance, an EPROM, in which said measured values are stored after they had been determined in practice.

In short, the present invention provides in particular a circuit arrangement for the torque control of a hydrostatic machine, and indeed for the hydraulic system with impressed operating pressure, with the following being provided: a pick-up means coupled to means representing the pivot angle and the eccentricity, respectively, so as to represent the actual value of the displacement volume of the machine and, based on an intentionally adjustable desired value of the torque, said pick-up means generates a control signal for controlling a valve which is adapted to actuate a control element. Said control element being adapted to change the displacement volume of the machine taking into consideration the operating parameters like pressure, speed and temperature, said displacement volume determining the torque, wherein further the pivot angle (or the eccentricity) are measured in an analog or a digital manner and the desired value of the pivot angle $$\alpha = \frac{M}{P}$$

(or the excentricity $$E = \frac{M}{P})$$

is calculated, or the outputted voltage for the desired pivotal angle is determined from "previously" stored measured values. Preferably, a speed limit value is superimposed onto the torque control, said speed limit value being such that it should not be exceeded for an erroneous operation of the machine.

Further preferred embodiments of the invention are disclosed in the claims and in the following description of embodiments:

BRIEF DESCRIPTION OF THE DRAWINGS

FIG. 8 shows characteristics for Md/Nm versus $\alpha$ for 200 bar; and

FIG. 9 shows characteristics for Md/Nm versus $\alpha$ for 250 bar.

DETAILED DESCRIPTION OF THE PRESENTLY PREFERRED EMBODIMENTS

Figure 1:
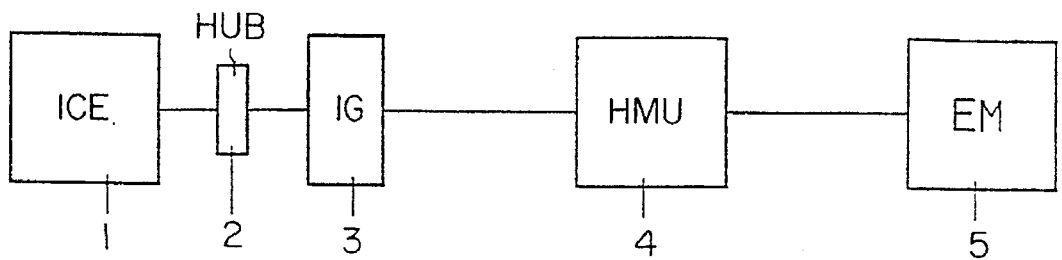
FIG. 1 is a block diagram of a hydrostatic test equipment of the prior art for internal combustion engines.
Figure 1A:
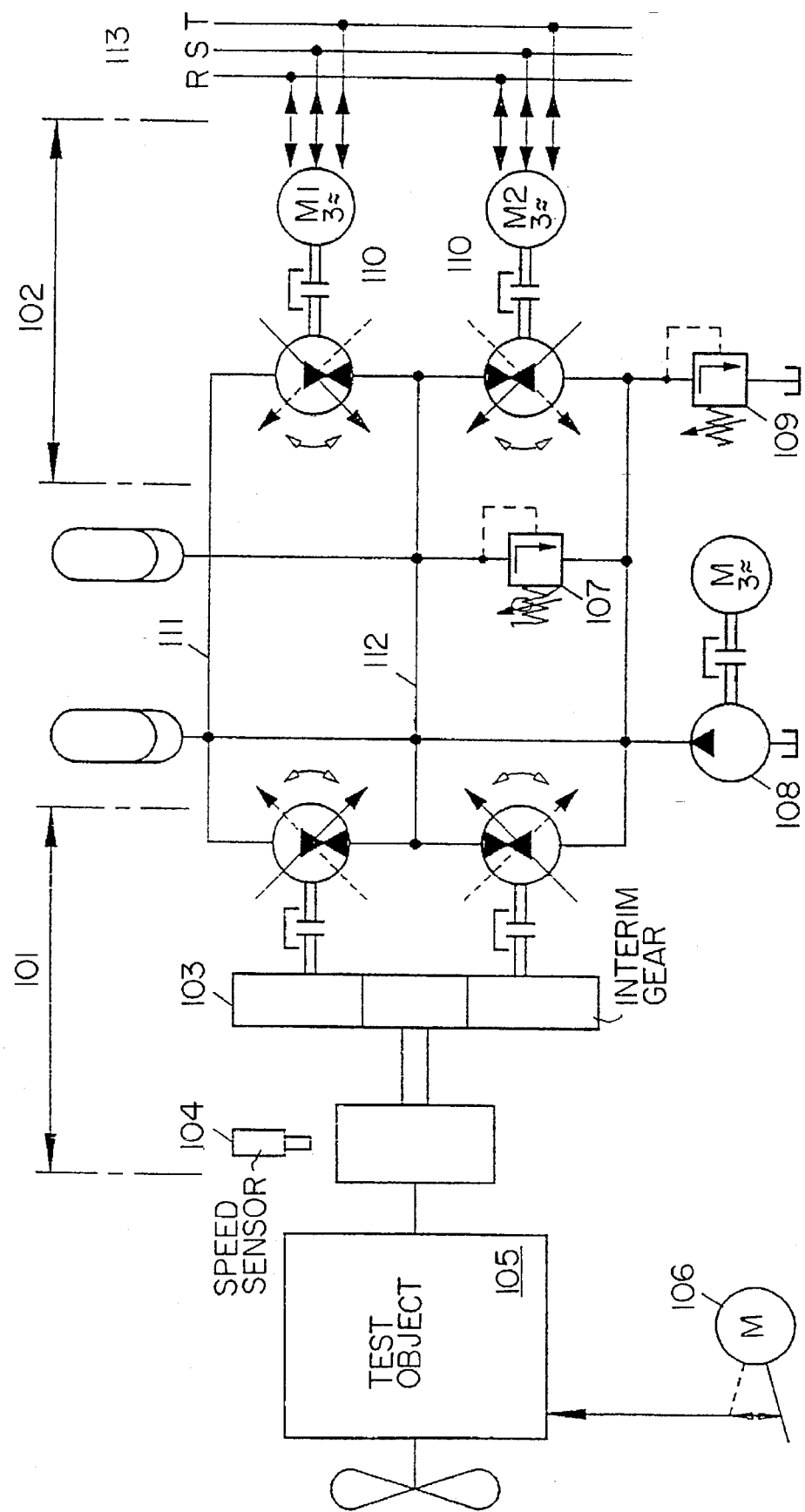
FIG. 1a is a more detailed representation of FIG. 1 and in accordance with picture 54 of the above-mentioned reference "The Hydraulic Trainer", volume 6.

FIG. 1 is an overview of and FIG. 1a shows in detail test equipment of the prior art used for internal combustion engines which is coupled to an intermediate gear means 3 by means of a torque measurement hub 2. The gear means 3 is coupled to a hydrostatic machine unit, which in turn is coupled to an electric machine 5. FIG. 1 shows in more detail that hydraulic accumulator means(not referred to by reference numeral) are provided, which will supply the required energy for the acceleration of the load machines 2, 3, 4 itself. Said hydraulic accumulator means will also store energy during a braking operation.

Continuing with a description of FIG. 1a one recognizes a load machine 100, mains aggregates 102, interim gear means 103, a speed sensor 104, a test object 105, an internal combustion engine 106, a throttle adjustment means, a safety valve, a supply pump 108, a supply pressure valve 109, an asynchronous machine 110 (160 kW), a low pressure side 111, a high pressure side 112 and an electric mains power supply 113.

Figure 2:
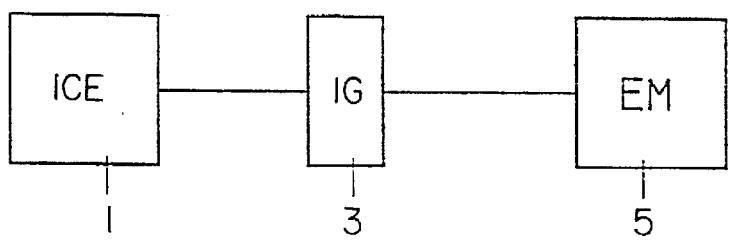
FIG. 2 is a block diagram of a prior art test equipment for internal combustion engines based on an electric approach.

FIG. 2 shows a block diagram for a purely electric solution according to the prior art which is otherwise similar to FIG. 1. Thus FIG. 2 shows a combustion engine 1 as well as an electric motor 5 and an interim drive means 3. For this solution no torque measurement hub is required in as much as the torque is calculated. The disadvantages of this equipment were already mentioned and will be touched upon again at the end of this description.

Figure 3:
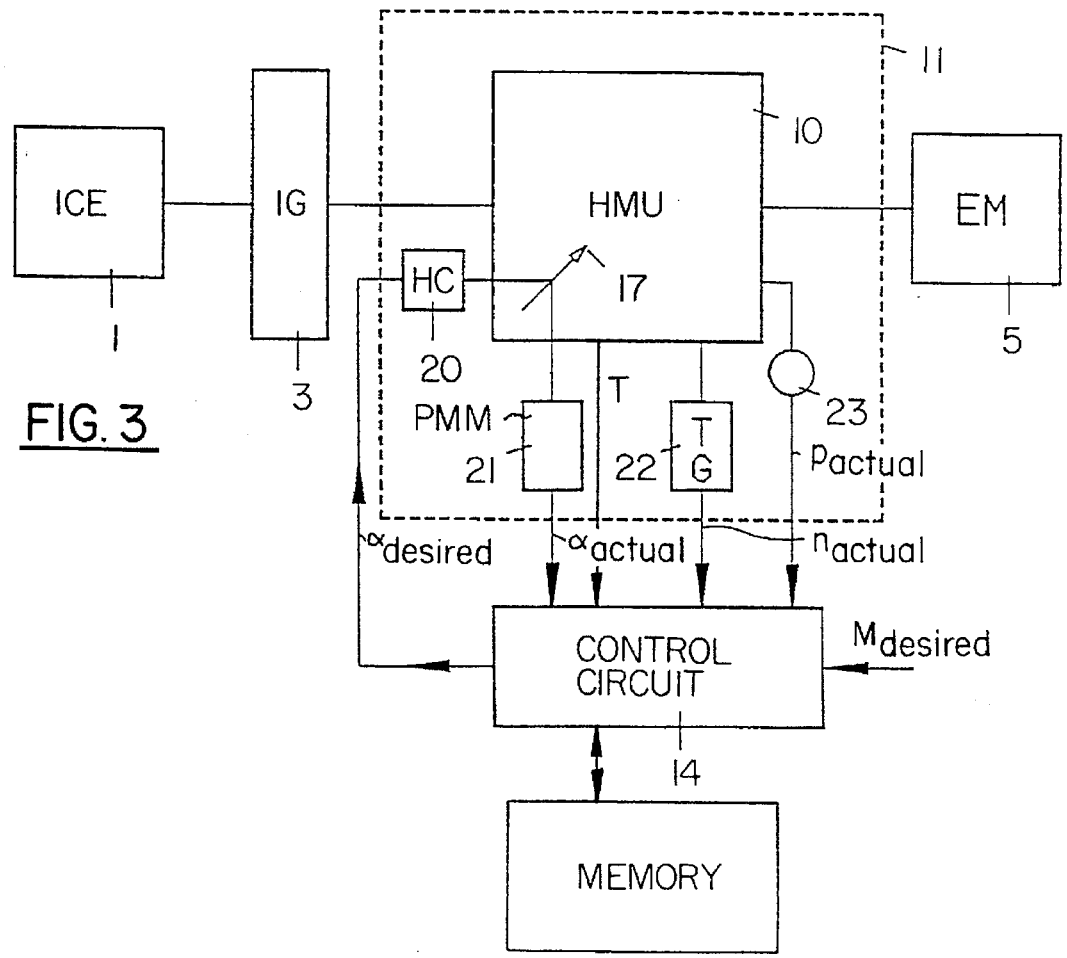
FIG. 3 is a block diagram of a test equipment for combustion engines in accordance with the present invention, representing a first embodiment of the invention in the area of a preferred application.

FIG. 3 discloses a block diagram of a first embodiment of the invention. The internal combustion engine is referred to again by reference numeral 1, the intermediate gear means is referred to by 3 and the electric motor is referred to by reference numeral 5 similarily to FIG. 1.

Figure 4:
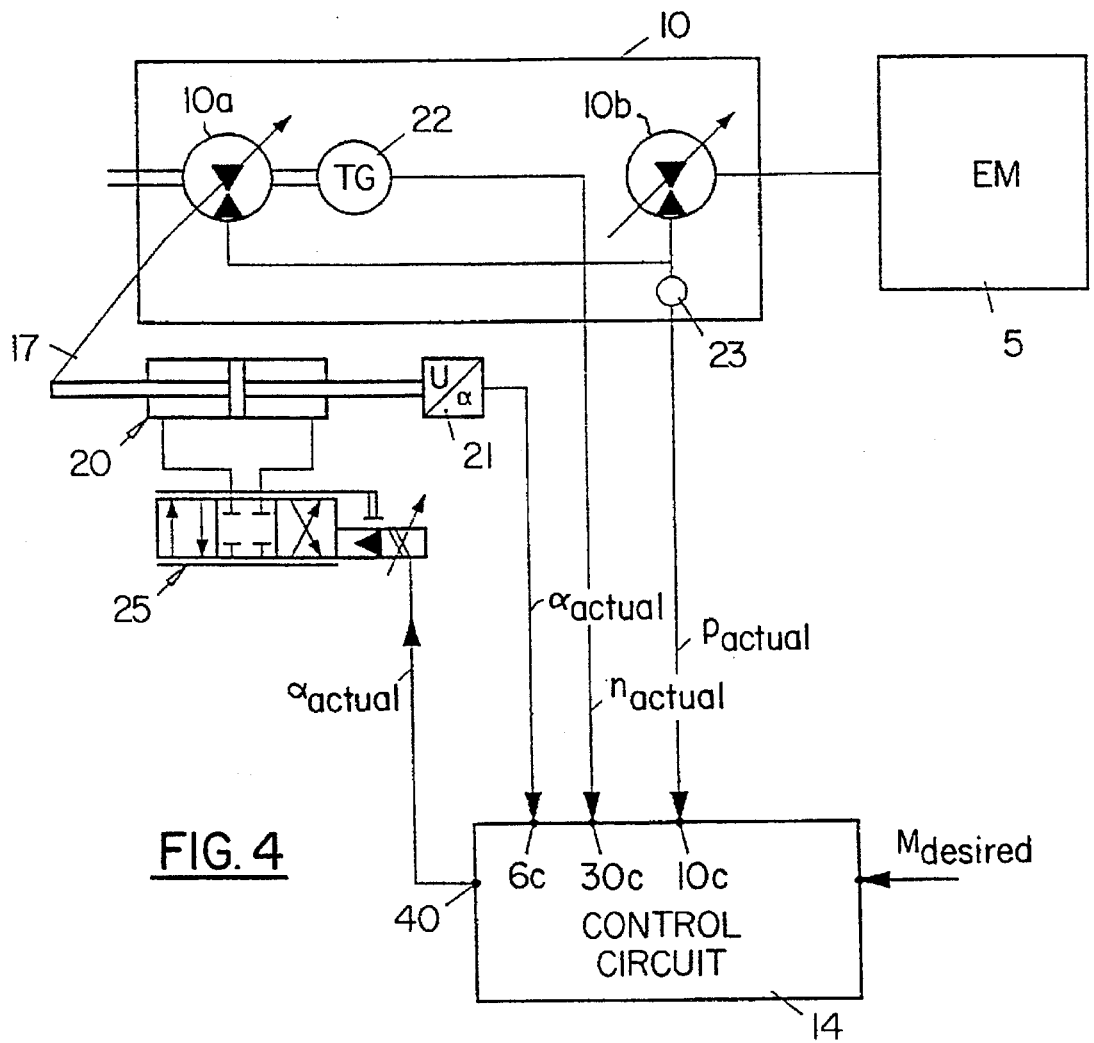
FIG. 4 is a block diagram of a second embodiment of a preferred modification of the embodiment of FIG. 3.

A hydrostatic machine unit 10 is arranged between the gear means 3 and the electric motor 5. Said hydrostatic machine unit 10 comprises at least two hydrostatic machines which are referred to by reference numerals 10a and 10b as is shown in FIG. 4. Generally speaking, the machine unit 10 can be of similar design as is shown in FIG. 1a. A machine unit 10 with for example two sets of pumps/motors as is shown in FIG. 1a, has the advantage of allowing a higher dynamic operation compared with a large single machine of twice the size.

The machine unit 10 supplies its parameters or characteristic values, in particular $\alpha_{actual}$, $n_{actual}$ and $P_{actual}$ (and possibly also the temperature and other values) to control signal generating means (short: a control circuit) 14. The control circuit 14 is also supplied with a desired torque signal $M_{desired}$ which represents the desired torque. Based on the desired torque signal as well as the parameters $\alpha_{actual}$, $n_{actual}$, $P_{actual}$ and possibly other parameters, the control circuit 14 develops a control signal $\alpha_{desired}$. This signal $\alpha_{desired}$ refers specifically with respect to a respective pump to the actual value of the pivotal angle. For a different type of pump, $\alpha_{desired}$ would considered to be the desired value for the eccentricity. Generally speaking, $\alpha_{desired}$ represents the required displacement volume of the machine unit 10 based on the desired torque signal which is present.

The desired pivot angle signal $\alpha_{desired}$ acts via a control or actuation element 20 on a swash plate 17 and adjusts said swash plate 17 in accordance with the value $\alpha_{desired}$. For reasons of simplicity we will refer here to what would be generally called "displacement volume changing means" 17 as a swash plate. In fact, a swash plate is a typical example of a displacement volume change means that can be used in a hydrostatic machine unit. However, as already mentioned a plurality of swash plates could be provided and, instead of swash plates other means could be provided which change the eccentricity of a pump.

The axial pivot (or pivotal) angle signal $\alpha_{desired}$ is fed back by means of a position measurement means 21, the input of which is directly or indirectly connected to the swash plate 17. Moreover, a tacho generator 22 is provided which is connected for instance with the shaft of the machine unit 10. The tacho generator 22 supplies the actual speed signal $n_{actual}$ to the control circuit 14. A pressure sensor 23 supplies the control circuit with an actual pressure signal $P_{actual}$. This actual pressure value represents the impressed operating pressure of the machine unit 10. Altogether, the machine unit 10 together with the control element 20, the position measurement means 21, the tacho generator 22 and the pressure sensor 23 are referred to as a hydrostatic machine arrangement 11.

FIG. 4 discloses a second embodiment of the invention which differs from the embodiment of FIG. 3 insofar as the processing of the desired pivot angle signal $\alpha_{desired}$ and the derivation of the actual pivot angle signal are more closely shown. The machine unit again referred to by reference numeral 10, is however, only schematically represented, i.e. there are also preferably other components like for instance accumulators present as there are shown in FIG. 1a. It is important that, as is true for the embodiment of FIG. 3, in accordance with the invention no torque measurement hub is required, inasmuch as the torque can be derived from existing values due to the use of the secondary control. With respect to the term "secondary control" again attention is drawn to volume 6 of "The Hydraulic Trainer". See specifically pages 13 and the following in said book.

It can be recognized in FIG. 4 that the control element 20 is designed as a hydraulic cylinder which is adapted to pivot the swash plate 17 according to the desired pivot angle signal $\alpha_{desired}$. A valve 25, preferably a proportional valve supplies one or the other side of the hydraulic cylinder 20 (depending on the desired quadrant) with fluid for operation. Further, the position measurement means 21 is connected to the piston of the hydraulic cylinder 20 to supply the actual pivot angle signal $\alpha_{actual}$ to the control circuit 14. Reference is also made to pictures 7 and 8 at pages 18 and 19 of volume 6 of "The Hydraulic Trainer".

Figure 5:
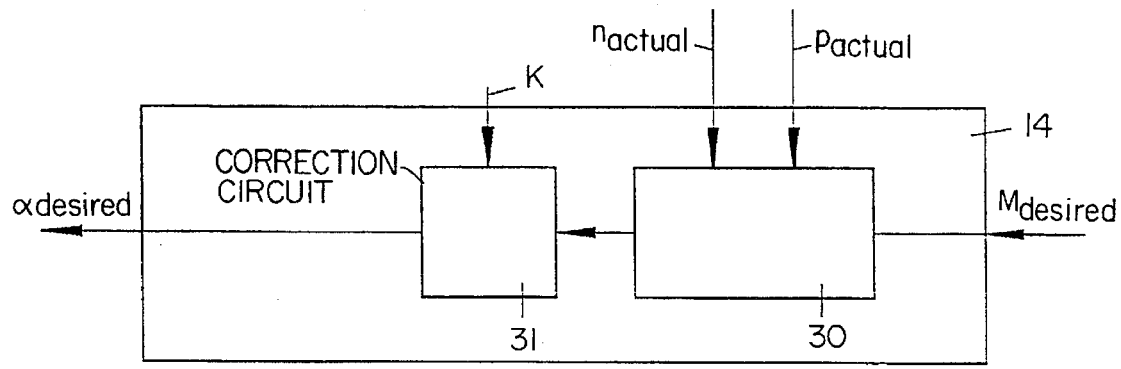
FIG. 5 is a block diagram of a third embodiment and of a further modification of the embodiment of FIG. 4.

FIG. 5 is the block diagram of a third embodiment of the present invention. The control circuit 14 initially generates corresponding to the desired torque signal $M_{desired}$—specifically based on the actual speed signal $n_{actual}$ and the actual pressure signal $P_{ist}$—a signal which will be modified by a correction signal K in a correction circuit, so as to generate the desired pivot angle signal $\alpha_{desired}$.

Figure 6:
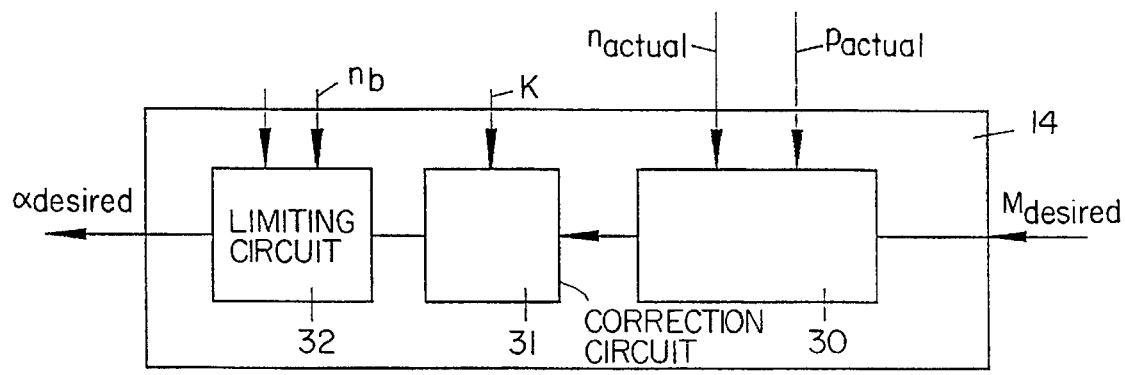
FIG. 6 is a block diagram of a fourth embodiment showing a further modification of the embodiment of FIG. 5.

FIG. 6 discloses a fourth embodiment of the invention which differs from the circuit of FIG. 5 insofar as a limiting circuit 32 follows the correction circuit 31. The limiting circuit 32 makes sure that, if an error occurs, the speed is limited for reasons of safety.

Figure 7B:
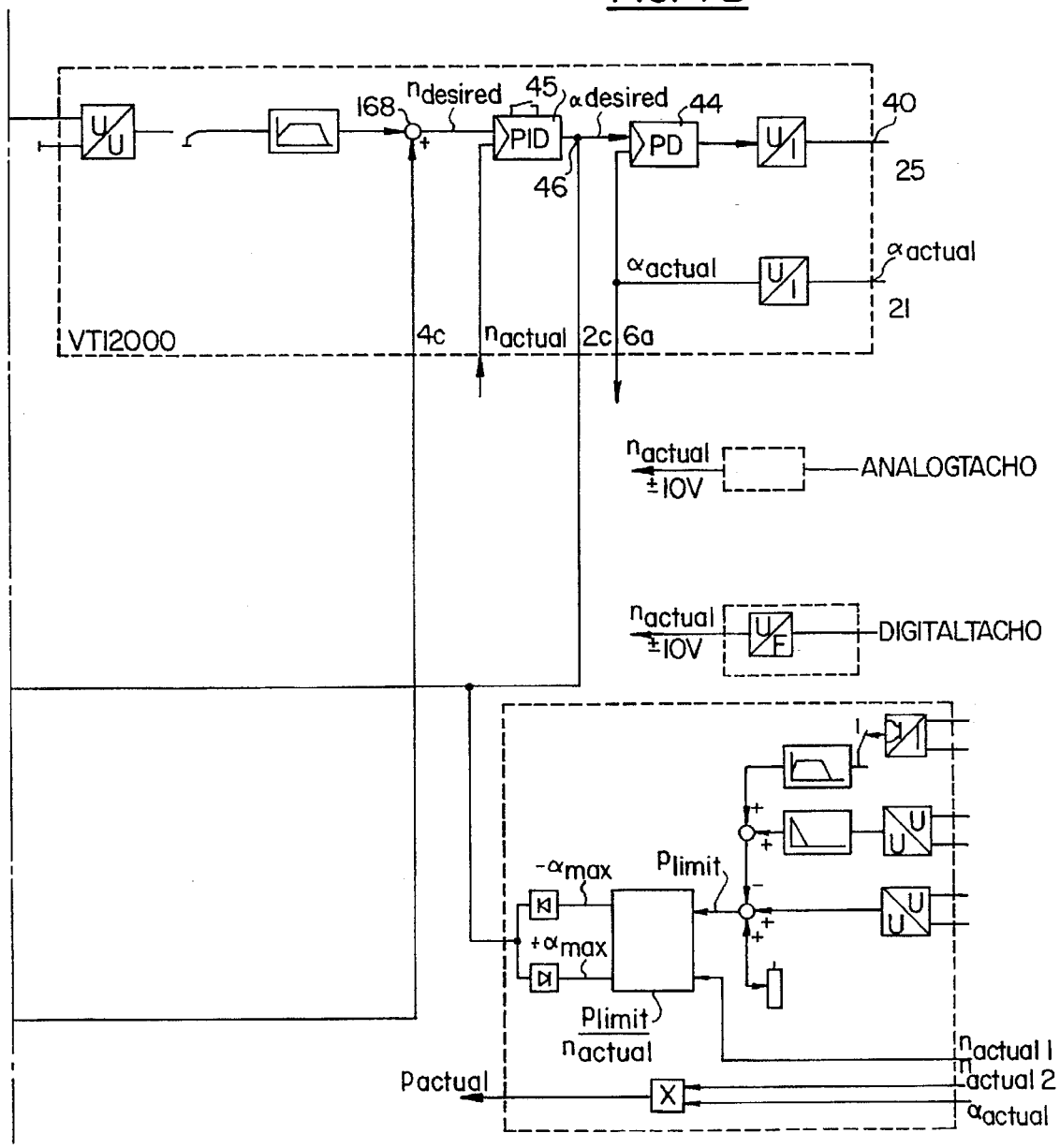
FIG. 7 is a block diagram of a fifth embodiment showing another modification of the embodiment of FIG. 6.

FIG. 7 discloses a fifth embodiment of the invention, showing the control circuit 14 in some detail. In the case as shown, the control circuit 14 is realized on boards. Below, particularly the torque board 35 will be described in more detail.

For easy understanding, specifically the reference numerals 6c, 30c, 10c and 8c of FIG. 7 are also shown in FIG. 4.

Turning now to FIG. 7, it can be noted that the desired torque signal $M_{desired}$ is supplied via a junction 41 to a calculating circuit 42. At the junction 41 a combination occurs with the actual values of the speed. At a second input of the calculating circuit 42 an actual pressure signal $P_{actual}$ is applied. The calculating circuit 42 calculates a desired pivot angle $\alpha_{desired}$ which corresponds to the desired torque $M_{desired}$. Said value $\alpha_{desired}$ is preferably supplied to a junction 43 where, if required, a combination occurs with a correcting value which is supplied via terminal 24c. Then, the desired pivot angle signal $\alpha_{desired}$, being processed in the just mentioned manner, will be present at the output 2c of the torque board 35. The signal at 2c is then supplied to a PD closed loop controller 44 to which also supplied the actual signal $\alpha_{actual}$ so as to generate at 40 the $\alpha_{desired}$ (the desired pivot angle signal) which is supplied to the valve 25.

An important feature of the control circuit of FIG. 7 is the provision of a speed limiting means. The desired limiting value for the speed is supplied to the torque board 35 at input 28c. At 4c a desired speed signal $n_{desired}$ is supplied which corresponds to the desired speed limitation. Said value $n_{desired}$ is supplied in the manner shown via a junction to one input of a PID closed loop controller 45. At the other input of said PID controller 45 the actual speed value $n_{desired}$ is supplied. In case a problem occurs, the signal $\alpha_{desired}$ is made ineffective by the PID controller 45 at the junction 46.

As was mentioned above, there exists on the one hand the possibility to calculate the desired value of the pivotal angle (or the desired value of the eccentricity) in accordance with the formula $$\alpha = \frac{M}{p} \quad \left( \text{or } E = \frac{M}{p} \right).$$

Besides said so called analog approach, it is also possible to operate digitally, i.e. the voltage for the desired pivotal angle existing at 2c in FIG. 7 is determined from "previously" determined measured values which are characteristic for the hydraulic machine unit which is used. See in this context the characteristics shown in FIGS. 8 and 9 which disclose examples of such measured values.

Turning now to the function of the present invention, the following comments are made. There are certain general formulas which show certain relationships as follows.

The maximum torque which can be supplied by a secondary unit can be calculated according to the following equation:

$$M_{ab} = \frac{(\text{delta } p) \times V \times \eta_{ges.}}{20 \times \pi} \; [\text{Nm}]$$

wherein:

delta p=pressure differential between the input and the output $$\left[ \text{bar } o. \frac{daN}{cm^2} \right]$$

V=geometric delivery or output volume [$cm^3$]

$\eta_{ges.}$=entire efficiency

Simplification:

$$M_{ab} = \frac{(\text{Delta } p) \times V_{max} \times \alpha/\alpha_{max}}{62.8} \; [\text{Nm}]$$

wherein:

$\alpha$=pivotal angle of the secondary unit $\alpha_{max} = \pm 15° \hat{=} \pm 10.0 \; V$ $\alpha/\alpha_{max} = \pm (0.0 \ldots 1.0) \hat{=} (0 \; V - \pm 10.0 \; V)$ Determination of torque:

By means of an analog calculating circuit 50 the actual pivot angle value (6c→6a) is combined with the actual pressure value (10c→10a). The corrected value is determined by an analog calculating circuit depending on the rated size of the selected secondary unit and the actual speed, the calculating circuit being located on the main board, i.e. the torque board. Alternatively, the corrected value is calculated by means of an additional board in a digital manner depending on the speed, the pressure and the temperature depending on the preselected rated size being taken out of a field of charcteristic lines. The correcting value then represents the pivotal angle depending on said values which is during the motor operation and generator operation additionally necessary, so as to balance the losses of the unit 10 and to keep the speed constant.

In case that the torque board 35 is used during motor operation for determining the torque and for displaying the torque, then said corrected value will be substracted from the measured pivotal angle and then the actually acting torque will be calculated by a combination based on multiplication with the measured pressure value and it will be supplied by an amplifier at input 4a.

In case the unit 10 operates as a generator, then said correcting value will be added to the measured pivotal angle inasmuch as now the correcting value acts in the sense of an additional torque.

Control of torque:

Another particularly preferred possibility of the torque board 35 resides in the fact that the preselected torque can be electronically maintained constant by influencing the desired value of the pivotal angle taking into consideration the correcting values depending on the system. The correcting value is then formed the same way as for the determination of the torque.

In case the torque board 35 is used for controlling the torque during motor operation, then the correcting value will be added to the calculated desired pivotal angle which results from the desired torque and the actual pressure; the resulting analog voltage value control appears via the terminal 2c by means of a limiting circuit of the output of the pivot angle control of the secondary control electronic VT 12000.

When determining the torque, the fact whether the unit is operating as a motor or as a generator is also taken into consideration.

Closed loop control of the torque and control of the torque:

By means of a limiting circuit provided in the board the maximum speed can be predetermined for all types of operation separately for left and right rotation, selectively with internal adjustment means for the desired value or externally via inputs of differential amplifiers.

When using the secondary control electronic VT 12000 an overspeed situation of the drive beyond the adjusted maximum speed cannot occur.

Summarizing it can be said that the customary torque measuring hubs are generally useful only for static measurements while they break down within a short period of time, if they are used for highly dynamic measurements. The electric drive technique has taken this fact into consideration. For the pendulum-direct-current motor the torque is measured by means of a force sensor. Here the influence of the electric cables onto the measurement is considered to be constant. For direct current machines and synchronous current machines, supplied by semiconductors, the current requirement which depends on the speed is determined by a tacho generator and the total current is measured. The torque is calculated from the current differential. This method is said to be highly precise. However, because of the large inertia of masses specifically for dynamic operations, the mechanical torque is difficult to distinguish from the torque in the air gap. If one compares a controlled electric axis of 100 kW with respect to torque changes per unit of time of about 12000 1/min/s with a controlled hydrostatic axis of about 80000 1/min/s, then the same problems occur in shorter periods of time. Thus, there was a need to look for possibilities of the torque control with no torque measurement hub being required, at reasonable cost and with high precision. The hydrostatic machine with pendulum requires for the supply of oil a costly rotary passage which does not work precisely due to the high frictional forces.

As mentioned above, it is easier to determine the torque from the pressure and the pivot angle as follows:

$$Md = \Delta p \cdot \alpha$$

Secondary controlled drives use a "pure" speed control. The system is double integral. For stabilization the pivot angle is fed back electrically in a cascade. Inductive position measuring means, differential transformer position measuring means, which are located in the leakage oil chamber of the units, or inductive position measuring means in the high pressure chamber of the piston are used because of the higher resolution. Said position measuring means are also used for conventional primary closed loop controlled and controlled, respectively, machines. In accordance with the invention the determination of the torque is carried out by a positionaly feed-back of the adjustment cylinder 20 in the low pressure area and the high pressure area, respectively, taking into consideration the operating pressure, with the speed being a parameter. The position of the adjustment cylinder 20 determines via a mechanical means the pivotal angle (or the eccentricity) and thus the displacement volume of the unit 10.

Prior to shipping the units 10 to a customer, they will be tested on a test equipment and both pivotal ranges are covered and the torque is measured quasi statically depending on the operating pressure and with the speed as a parameter via a suitable electronic, with the curves or characteristics being linearized. In the case of closed loop controls of the torque, the electronic supplies, depending on the speed and the operating pressure, the respective position of the adjustment piston.

Thus, the secondary controlled and speed controlled axis is suitable without any additional mechanical components for the closed loop torque control, i.e. here for the control of the torque in the highly dynamic area. Due to the lack of moments caused by inertia, the preciseness is sufficiently good. A torque measuring hub is, as was already mentioned, not required.

FIGS. 8 and 9 disclose characteristics as they are used for the digital approach.

I claim:

1. A circuit arrangement for the control of the output torque of a hydrostatic machine connected to a hydraulic system having an impressed operating pressure, said circuit arrangement comprising:

a control element for changing the displacement volume which in turn determines the output torque of the machine, the change of the displacement volume being based upon operating parameters corresponding to pressure, speed and temperature;

control means supplied with a desired torque value for generating a control signal for actuating said control element;

pick-up means connected to said control means and to said control element for picking up a pivotal angle $\alpha$ representing an actual displacement volume of said hydrostatic machine, wherein the pivotal angle $\alpha$ is measured in at least one of an analog and a digital manner, and wherein, when measured in an analog manner, the desired value of the pivotal angle $\alpha = M/P$, wherein M is the torque and P is the pressure and wherein, when measured in a digital manner, the outputted voltage for the pivotal angle is determined from previously determined measured values, and wherein the desired value of the pivot angle which is applied to the control member is a corrected desired value, corrected with respect to an internal speed of the machine unit.

2. The circuit arrangement of claim 1 wherein valve means serve for the actuation of the control element, and wherein the control signal for actuating the control element is the desired value of the pivotal angle, said control signal being used for energizing the valve means.

3. The circuit arrangement of claim 1 wherein the desired value of the pivot angle which is applied to the control member is a corrected desired value, corrected with respect to internal losses of the machine unit.

4. A circuit arrangement for controlling the output torque of a hydrostatic machine connected to a hydraulic system having an impressed operating pressure, said circuit arrangement comprising:

a control element for changing the displacement volume therewith the output torque of the machine, the change in displacement volume being based upon operating parameters corresponding to pressure, speed and temperature;

control means supplied with a desired torque value for generating a control signal for actuating said control element;

pick-up means connected to said control means and to said control element for picking up a pivotal angle α representing an actual displacement volume of said hydrostatic machine, wherein the pivotal angle α is measured in at least one of an analog and a digital manner, and wherein, when measured in an analog manner, the desired value of the pivotal angle is α=M/P, where M is the torque and P is the pressure, wherein, when measured in a digital manner, the desired value for the pivotal angle is determined from previously determined measured values, and wherein a speed limit value is superimposed onto the torque control, said speed limit value being such that it cannot be exceeded in a error situation of the machine.

5. A circuit arrangement for controlling the output torque of a hydrostatic machine connected to a hydraulic system having an impressed operating pressure, said circuit arrangement comprising:

a control element for changing the displacement volume which in turn determines the output torque of the machine, the displacement volume being changed based upon operating parameters corresponding to pressure, speed and temperature;

control means supplied with a desired torque value for generating a control signal for actuating said control element;

memory means connected to said control means;

pick-up means connected to said control means and to said control element for picking up a pivotal angle α representing an actual displacement volume of said hydrostatic machine, wherein the pivotal angle α is measured in at least one of an analog and a digital manner, and wherein, when measured in an analog manner, the desired value of the pivotal angle is α=M/P, where M is the torque and P is the pressure, wherein, when measured in a digital manner, the desired value for the pivotal angle is determined from previously determined measured values, and wherein previously determined measured values are stored in said memory means.

6. The circuit arrangement of claim 5, wherein a speed limit value is superimposed onto the torque control, said speed limit value being such that it cannot be exceeded in a error situation of the machine.

7. A circuit arrangement for controlling the output torque of a hydrostatic machine connected to a hydraulic system having an impressed operating pressure, said circuit arrangement comprising:

a control element for changing the displacement volume which in turn determines the output torque of the machine, the change of displacement volume being based upon operating parameters corresponding to pressure, speed and temperature;

control means supplied with a desired torque value for generating a control signal for actuating said control element;

pick-up means connected to said control means and to said control element for picking up a pivotal angle α representing an actual displacement volume of said hydrostatic machine, wherein the pivotal angle α is measured in at least one of an analog and a digital manner, and wherein, when measured in an analog manner, the desired value of the pivotal angle is α=M/P, where M is the torque and P is the pressure, wherein, when measured in a digital manner, the desired value for the pivotal angle is determined from previously determined measured values, and wherein the machine unit comprises one or a plurality of hydrostatic machines with at least some of axial piston arrangements.

8. A method of controlling the output torque of a hydrostatic machine in a hydraulic system having an impressed operating pressure, said method comprising the following steps:

representing the actual displacement volume of the machine by an actual displacement signal corresponding to a pivotal angle of said hydrostatic machine, determining a control signal for actuating a control element so as to change the displacement volume of the machine which determines the output torque by considering operating parameters for pressure, speed and temperature, wherein the pivotal angle is measured in an analog or a digital manner, and wherein, when calculated in the analog manner, the desired value of the pivotal angle is calculated, and wherein, when calculated in the digital manner, the desired value of the pivotal angle is determined from previously predetermined stored values.

9. A circuit arrangement for the control of the output torque of a hydrostatic machine connected to a hydraulic system having an impressed operating pressure, said circuit arrangement comprising:

a control element for changing the displacement volume which in turn determines the output torque of the machine, the change of the displacement volume being based upon operating parameters corresponding to pressure, speed and temperature;

control means supplied with a desired torque value for generating a control signal for actuating said control element;

pick-up means connected to said control means and to said control element for picking up and an eccentricity E representing an actual displacement volume of said hydrostatic machine, wherein the eccentricity E is measured in at least one of an analog and a digital manner, and wherein, when measured in an analog manner, the desired value of the eccentricity E=M/P, wherein M is the torque and P is the pressure and wherein, when measured in a digital manner, the outputted voltage for the eccentricity is determined from previously determined measured values, and wherein the desired value of the eccentricity which is applied to the control member is a corrected desired value, corrected with respect to a speed of the machine unit.

10. The circuit arrangement of claim 9, wherein valve means serve for the actuation of the control element, and wherein the control signal for actuating the control element is the desired value of the eccentricity, said control signal being used for energizing the valve means.

11. The circuit arrangement of claim 9, wherein the desired value of the eccentricity which is applied to the control member is a corrected desired value, corrected with respect to internal losses of the machine unit.

12. A circuit arrangement for controlling the output torque of a hydrostatic machine connected to a hydraulic system having an impressed operating pressure, said circuit arrangement comprising:

a control element for changing the displacement volume therewith the output torque of the machine, the change in displacement volume being based upon operating parameters corresponding to pressure, speed and temperature;

control means supplied with a desired torque value for generating a control signal for actuating said control element;

pick-up means connected to said control means and to said control element for picking up an eccentricity E representing an actual displacement volume of said hydrostatic machine, wherein the eccentricity E is measured in at least one of an analog and a digital manner, and wherein, when measured in an analog manner, the desired value of the eccentricity is $E=M/P$, where M is the torque and P is the pressure, wherein, when measured in a digital manner, the desired value for the eccentricity is determined from previously determined measured values, and wherein a speed limit value is superimposed onto the torque control, said speed limit value being such that it cannot be exceeded in a error situation of the machine.

13. A circuit arrangement for controlling the output torque of a hydrostatic machine connected to a hydraulic system having an impressed operating pressure, said circuit arrangement comprising:

a control element for changing the displacement volume which in turn determines the output torque of the machine, the displacement volume being changed based upon operating parameters corresponding to pressure, speed and temperature;

control means supplied with a desired torque value for generating a control signal for actuating said control element;

memory means connected to said control means;

pick-up means connected to said control means and to said control element for picking up an eccentricity E representing an actual displacement volume of said hydrostatic machine, wherein the eccentricity E is measured in at least one of an analog and a digital manner, and wherein, when measured in an analog manner, the desired value of the eccentricity is $E=M/P$, where M is the torque and P is the pressure, wherein, when measured in a digital manner, the desired value for the eccentricity is determined from previously determined measured values, and wherein previously determined measured values are stored in said memory means.

14. The circuit arrangement of claim 13, wherein a speed limit value is superimposed onto the torque control, said speed limit value being such that it cannot be exceeded in a error situation of the machine.

15. A circuit arrangement for controlling the output torque of a hydrostatic machine connected to a hydraulic system having an impressed operating pressure, said circuit arrangement comprising:

a control element for changing the displacement volume which in turn determines the output torque of the machine, the change of displacement volume being based upon operating parameters corresponding to pressure, speed and temperature;

control means supplied with a desired torque value for generating a control signal for actuating said control element;

pick-up means connected to said control means and to said control element for picking up an eccentricity E representing an actual displacement volume of said hydrostatic machine, wherein the eccentricity E is measured in at least one of an analog and a digital manner, and wherein, when measured in an analog manner, the desired value of the eccentricity is $E=M/P$, where M is the torque and P is the pressure, wherein, when measured in a digital manner, the desired value for the eccentricity is determined from previously determined measured values, and wherein the machine unit comprises one or a plurality of hydrostatic machines with at least some radial piston arrangements.

16. A method of controlling the output torque of a hydrostatic machine in a hydraulic system having an impressed operating pressure, said method comprising the following steps:

representing the actual displacement volume of the machine by an actual displacement signal corresponding to an eccentricity of said hydrostatic machine, determining a control signal for actuating a control element so as to change the displacement volume of the machine which determines the output torque by considering operating parameters for pressure, speed and temperature, wherein the eccentricity is measured in an analog or a digital manner, and wherein, when calculated in the analog manner, the desired value of the eccentricity is calculated, and wherein, when calculated in the digital manner, the desired value of the eccentricity is determined from previously predetermined stored values.

\* \* \* \* \*